US009420265B2

(12) United States Patent
Taguchi et al.

(10) Patent No.: US 9,420,265 B2
(45) Date of Patent: Aug. 16, 2016

(54) TRACKING POSES OF 3D CAMERA USING POINTS AND PLANES

(71) Applicant: Mitsubishi Electric Research Laboratories, Inc., Cambridge, MA (US)

(72) Inventors: Yuichi Taguchi, Arlington, MA (US); Esra Ataer-Cansizoglu, Eskisehir (TR); Srikumar Ramalingam, Cambridge, MA (US); Tyler W Garaas, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 10 days.

(21) Appl. No.: 13/921,296

(22) Filed: Jun. 19, 2013

(65) Prior Publication Data

US 2014/0002597 A1    Jan. 2, 2014

Related U.S. Application Data

(63) Continuation-in-part of application No. 13/539,060, filed on Jun. 29, 2012, now Pat. No. 9,183,631.

(51) Int. Cl.
  *H04N 13/02*  (2006.01)
  *G06T 7/00*  (2006.01)

(52) U.S. Cl.
  CPC ............ *H04N 13/0275* (2013.01); *G06T 7/003* (2013.01); *G06T 7/0044* (2013.01); *G06T 2200/32* (2013.01); *G06T 2207/10016* (2013.01); *G06T 2207/10028* (2013.01);

(Continued)

(58) Field of Classification Search
  None
  See application file for complete search history.

(56) References Cited

U.S. PATENT DOCUMENTS

| | | | | |
|---|---|---|---|---|
| 4,856,199 A | * | 8/1989 | Merrill et al. | 33/203.17 |
| 4,922,430 A | * | 5/1990 | Wavish | 700/255 |
| 6,246,468 B1 | * | 6/2001 | Dimsdale | 356/4.02 |

(Continued)

FOREIGN PATENT DOCUMENTS

| KR | 20110097140 | 2/2010 |
|---|---|---|
| WO | 2012062652 A1 | 5/2012 |

OTHER PUBLICATIONS

Endres et al, "An Evaluation of the RGB-D SLAM System," 2012, IEEE International Conference on Robotics and Automation, pp. 1691-1696.*

(Continued)

*Primary Examiner* — David F Dunphy
(74) *Attorney, Agent, or Firm* — Gene Vinokur; James McAleenan; Hironori Tsukamoto

(57) ABSTRACT

A method registers data using a set of primitives including points and planes. First, the method selects a first set of primitives from the data in a first coordinate system, wherein the first set of primitives includes at least three primitives and at least one plane. A transformation is predicted from the first coordinate system to a second coordinate system. The first set of primitives is transformed to the second coordinate system using the transformation. A second set of primitives is determined according to the first set of primitives transformed to the second coordinate system. Then, the second coordinate system is registered with the first coordinate system using the first set of primitives in the first coordinate system and the second set of primitives in the second coordinate system. The registration can he used to track a pose of a camera acquiring the data.

14 Claims, 2 Drawing Sheets

(52) U.S. Cl.
CPC ............. *G06T 2207/20076* (2013.01); *G06T 2207/30241* (2013.01); *G06T 2207/30244* (2013.01)

(56) References Cited

U.S. PATENT DOCUMENTS

| | | | |
|---|---|---|---|
| 7,187,809 B2 | 3/2007 | Zhao et al. | |
| 2009/0174782 A1* | 7/2009 | Kahn et al. | 348/208.2 |
| 2010/0049391 A1 | 2/2010 | Nakano | |
| 2012/0075343 A1* | 3/2012 | Chen | G09G 5/397 345/633 |
| 2012/0121131 A1* | 5/2012 | Kim | 382/103 |
| 2012/0194516 A1 | 8/2012 | Newcombe | |
| 2012/0306847 A1* | 12/2012 | Lim et al. | 345/418 |
| 2013/0120736 A1* | 5/2013 | Bosse et al. | 356/4.01 |

OTHER PUBLICATIONS

Tamaazousti et al, 'NonLinear Refinement of Structure from Motion Reconstruction by Taking Advantage of a Partial Knowledge of the Environment', 2011, Computer Vision and Pattern Recognition (CVPR), 2011 IEEE Conference on, pp. 3073-3080.*

K. Pathak, A. Birk, N. Vaškeviius, and J. Poppinga. "Fast registration based on noisy planes with unknown correspondences for 3-D mapping." IEEE Trans. Robotics, 26(3):424-441, Jun. 2010.

A. J. B. Trevor, J. G. Rogers III, and H. I. Christensen. "Planar surface SLAM with 3D and 2D sensors." In Proc. IEEE Int'l Conf. Robotics Automation (ICRA), pp. 3041-3048, May 2012.

J. Weingarten and R. Siegwart. 3D SLAM using planar segments. In Proc. IEEE/RSJ Int'l Conf. Intelligent Robots and Systems (IROS), pp. 3062-3067, Oct. 2006.

Davison et al., "MonoSLAM Real-Time Single Camera SLAM," IEEE Transactoins on Pattern Analysis and Machine Intelligence, IEEE Computer Society, USA. vol. 29, No. 6, Jun. 1, 2007. pp. 1052-1067.

Taguchi et al.. "Point-plane SLAM for hand-held 3D Sensors," 2013 IEEE International Conference on Robotics and Automation (ICRA) May 6-10, 2013. Karlsruhe Germany. pp. 5182-5189.

Henry et al., "RGB-D Mapping: Using Kinect-style depth cameras for dense 3D modeling of indoor environments," The international journal of robotics research, vol. 31, No. 5. Feb. 10, 2012. pp. 647-663.

Lieberknecht et al., "RGBG-D Camera-Based Parallel Tracking and Meshing." Mixed and Augmented Reality (ISMAR) 2011 10th IEEE International Symposium on, IEEE. Oct. 26, 2011. pp. 147-155.

Weingarten et al., "3D SLAM using Planar Segments," Intelligent Robots and Systems, 2006 IEEE RSJ International Conference On. Oct. 1. 2006. pp. 3062-3067.

Jiang et al., "Camera Tracking for Augmented Reality Media," Multimedia and Expo, 2000. ICME 2000 IEEE International Conference on New York. Jul. 30, 2000. pp. 1637-1640.

* cited by examiner

TRACKING POSES OF 3D CAMERA USING POINTS AND PLANES

RELATED APPLICATION

This is a Continuation-in-Part of U.S. application Ser. No. 13/539,060, "Method for Registering Points and Planes of 3D Data in Multiple Coordinate Systems," filed by Assignee of present application and incorporated herein by reference.

FIELD OF THE INVENTION

This invention relates generally to computer vision, and more particularly to estimating a pose of a camera.

BACKGROUND OF THE INVENTION

Systems and methods that track the pose of a camera while simultaneously reconstructing the 3D structure of a scene are widely used in augmented reality (AR) visualization, robotic navigation, scene modeling, and computer vision applications. Such a process is commonly referred to as simultaneous localization and mapping; (SLAM). Real-time SLAM systems can use conventional cameras that acquire a two-dimensional (2D) image, depth cameras that acquire a three-dimensional (3D) point cloud (a set of 3D points), or red, green, blue and depth (RGB-D) cameras that acquire both a 2D image and a 3D point cloud, such as Kinect®. Tracking refers to a process that uses a predicted motion of a camera for sequentially estimating the pose of the camera, while relocalization refers to a process that uses some feature-based global registration for recovering from tracking failures.

SLAM systems using a 2D camera are generally successful for textured scenes, but are likely to fail for textureless regions. Systems using a depth camera rely on geometric variations in the scene, such as curved surfaces and depth boundaries with the help of iterative-closest point (ICP) methods. However. ICP-based systems often fail when the geometric variations are small, such as in planar scenes. Systems using an RGB-D camera can exploit both texture and geometric features, but they still require distinctive textures.

Many methods do not clearly address the difficulty in reconstructing 3D models that are larger than a single room. To extend those methods to larger scenes, better memory management techniques are required. However, memory limitation is not the only challenge. Typically, room-scale scenes have many objects that have both texture and geometric features. To extend to larger scenes, one needs to track the camera pose in regions, such as corridors, with limited texture and insufficient geometric variations.

Camera Tracking

Systems that use 3D sensors to acquire 3D point clouds reduce the tracking problem to a registration problem given some 3D correspondences. The ICP method locates point-to-point or point-to-plane correspondences iteratively, starting from an initial pose estimate given by camera motion prediction. ICP has been widely used for line-scan 3D sensors in mobile robotics, also known as scan matching, as well as for depth cameras and 3D sensors producing full 3D point clouds. U.S. 20120194516 uses point-to-plane correspondences with the ICP method for pose tracking of the Kinect® camera. That representation of a map is a set of voxels. Each voxel represents a truncated signed distance function for the distance to a closest surface point. That method does not extract planes from 3D point clouds; instead, the point-to-plane correspondences are established by determining the normal of a 3D point using a local neighborhood. Such ICP-based methods require scenes to have sufficient geometric variations for accurate registration.

Another method extracts features from RGB images and performs descriptor-based point matching to determine point-to-point correspondences and estimate the camera pose, which is then refined with the ICP method. That method uses texture (RGB) and geometric (depth) features in the scene. However, handling textureless regions and regions with repetitive textures using only point features is still problematic.

SLAM Using Planes

Plane features have been used in several SLAM systems. To determine the camera pose, at least three planes whose normals span $\mathcal{R}^3$ are required. Thus, using only planes causes many degeneracy issues especially when the field of view (FOV) or range of the sensor is small such as in Kinect®. A combination of a large FOV line-scan 3D sensor and a small field-of-view (FOV) depth camera can avoid the degeneracy with an additional system cost.

The method described in the related Application uses a point-plane SLAM, which uses both points and planes to avoid the failure modes that are common in methods using one of these primitives. That system does not use any camera motion prediction. Instead, that system performs relocalization for all the frames by locating point and plane correspondences globally. As a result, that system can only process about three frames per second and encounters failures with some repetitive textures due to descriptor-based point matching.

The method described in the related Application also presents registering 3D data in different coordinate systems using both point-to-point and plane-to-plane correspondences.

SUMMARY OF THE INVENTION

In indoor and outdoor scenes including man-made structures, planes are dominant. The embodiments of the invention provide a system and method for tracking an RGB-D camera that uses points and planes as primitive features. By fitting planes, the method implicitly takes care of the noise in depth data that is typical with 3D sensors. The tracking method is supported by relocalization and bundle adjustment processes to demonstrate a real-time simultaneous localization and mapping (SLAM) system using a hand-held or robot-mounted RGB-D camera.

It is an object of the invention to enable fast and accurate registration while minimizing degeneracy issues causing registration failures. The method locates point and plane correspondences using camera motion prediction, and provides a tracker based on a prediction-and-correction framework. The method incorporates relocalization and bundle adjustment processes using both the points and planes to recover from tracking failures and to continuously refine camera pose estimates.

Specifically, a method registers data using a set of primitives including points and planes. First, the method selects a first set of primitives from the data in a first coordinate system, wherein the first set of primitives includes at least three primitives and at least one plane.

A transformation is predicted from the first coordinate system to a second coordinate system. The first set of primitives is transformed to the second coordinate system using the transformation. A second set of primitives is determined according to the first set of primitives transformed to the second coordinate system.

Then, the second coordinate system is registered with the first coordinate system using the first set of primitives in the first coordinate system and the second set of primitives in the second coordinate system. The registration can be used to track a pose of a camera acquiring the data.

DETAILED DESCRIPTION OF THE PREFERRED EMBODIMENTS

The embodiments of our invention provide a system and method for tracking a pose of a camera. The invention extends the embodiments described in our related U.S. application Ser. No. 13/539,060 by using camera motion prediction for faster correspondence search and registration. We use point-to-point and plane-to-plane correspondences, which are established between a current frame and a map. The map includes points and planes from frames previously registered in a global coordinate system. Here, our focus is on establishing plane-to-plane correspondences using camera motion prediction as well as on a mixed case to establish both point-to-point and plane-to-plane correspondences.

System Overview

In the preferred system, the RGB-D camera 102 is a Kinect® or an ASUS® Xtion PRO LIVE, which acquires a sequence of frames 101. We use a keyframe-based SLAM system, where we select several representative frames as keyframes and store the keyframes registered in a single global coordinate system in a map. We use both points and planes as primitives in all the processes in the system, in contrast with the prior art SLAM which only uses points. Points and planes in each frame are called measurements, and measurements from the keyframes are stored in the map as landmarks.

Given the map, we use a prediction-and-correction framework to estimate the pose of the current frame: We predict the pose of the camera, and use the pose to determine correspondences between the point and plane measurements and the point and plane landmarks, which are then used to determine the camera pose.

Tracking may fail due to incorrect or insufficient correspondences. After a predetermined number of consecutive tracking failure, we relocalize, where we use global point and plane correspondence search between the current frame and the map. We also apply bundle adjustment using points and planes to refine landmarks in the map asynchronously.

Method Overview

Figure 1:
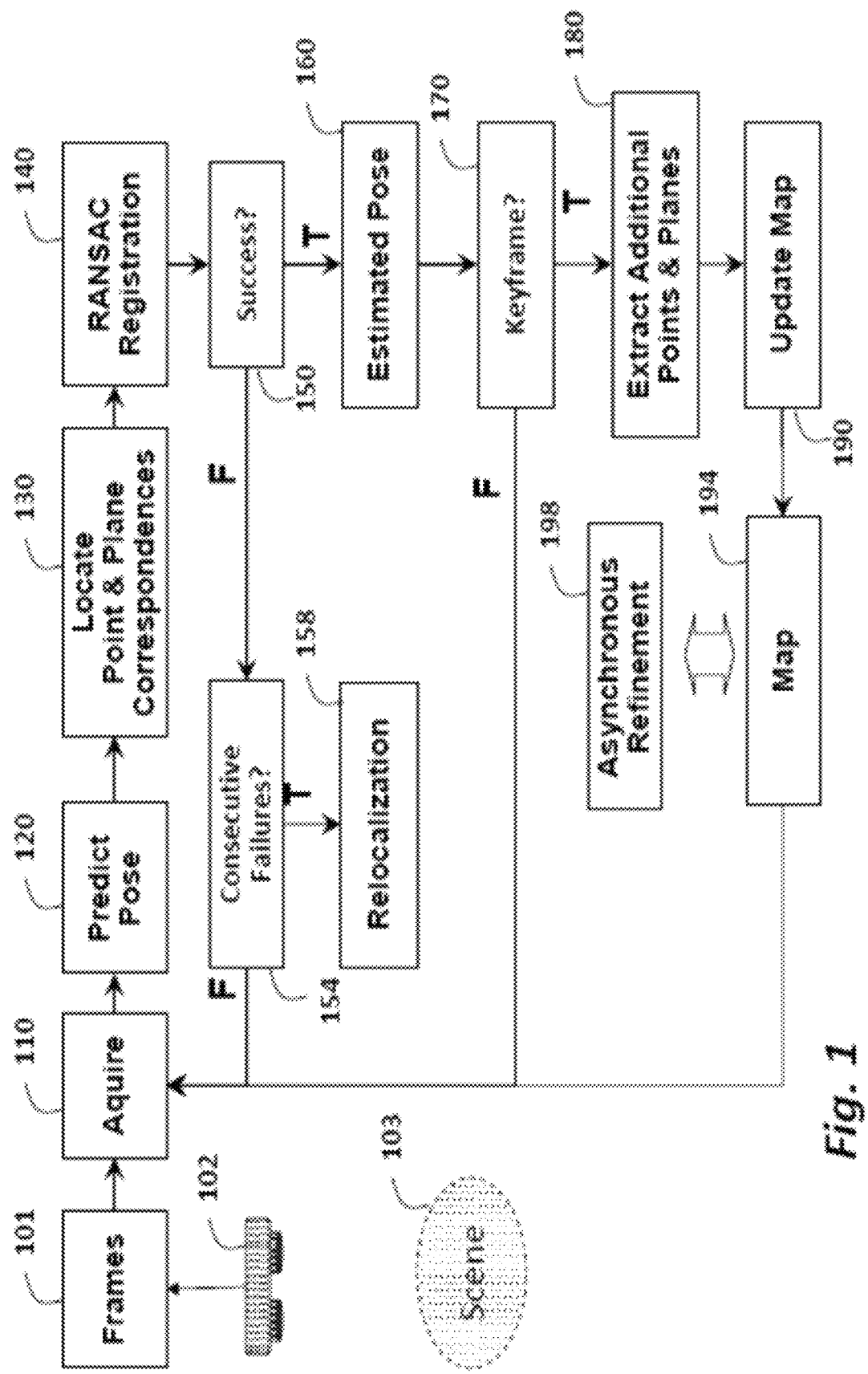
FIG. 1 is a flow diagram of a method for tracking a pose of a camera according to embodiments of the invention.

As shown in FIG. 1, a current frame 101 is acquired 110 by a red, green, blue and depth (RGB-D) camera 102 of a scene 103. A pose of the camera when acquiring the frame is predicted 120, which is used to locate 130 point and plane correspondences between the frame and a map 194. The point and plane correspondences are used in a RANdom SAmple Consensus (RANSAC) framework 140 to register the frame to the map. If 150 the registration fails, then count 154 the number of consecutive failures, and continue with the next frame if false (F), otherwise, if true (T) relocalize 158 the camera using a global registration method without using the camera motion prediction.

If the RANSAC registration succeeds, then the pose 160 estimated in the RANSAC framework is used as the pose of the frame. Next, determine 170 whether the current frame is a keyframe or not, and proceed with the next frame at step 110 if false. Otherwise, extract 180 additional points and planes in the current frame, update 190 the map 194, and proceed for the next frame. The map is asynchronously refined 198 using bundle adjustment.

The steps can be performed in a processor connected to memory and input/output interfaces as known in the au.

Camera Pose Tracking

As stated above, our tracking uses features that include both points and planes. The tracking is based on a prediction-and-correction scheme, which can be summarized as follows. For every frame, we predict the pose using a camera motion model. Based on the predicted pose, we locate the point and plane measurements in the frame corresponding to the point and plane landmarks in the map. We perform the RANSAC-based registration using the point and plane correspondences. If the pose is different from the poses of any keyframes currently stored in the map, then we extract additional point and plane measurements and add the frame to the map as a new keyframe.

Camera Motion Prediction

We represent the pose of the k th frame as $$T_k = \begin{pmatrix} R_k & t_k \\ 0^T & 1 \end{pmatrix}, \quad (1)$$

where $R_k$ and $t_k$ respectively denote a rotation matrix and a translation vector. We define the coordinate system of the map using the first frame; thus $T_1$ is an identity matrix, and $T_k$ represents the pose of the k th frame with respect to the map.

We predict the pose of the k th frame, $\hat{T}_k$, by using a constant velocity assumption. Let $\Delta T$ denote the previously estimated motion between the (k−1)th frame and (k−2)th frame, i.e., $\Delta T = T_{k-1} T_{k-2}^{-1}$. Then, we predict the pose of the k th frame as $\hat{T}_k = \Delta T T_{k-1}$.

Locating Point and Plane Correspondences

Figure 2:
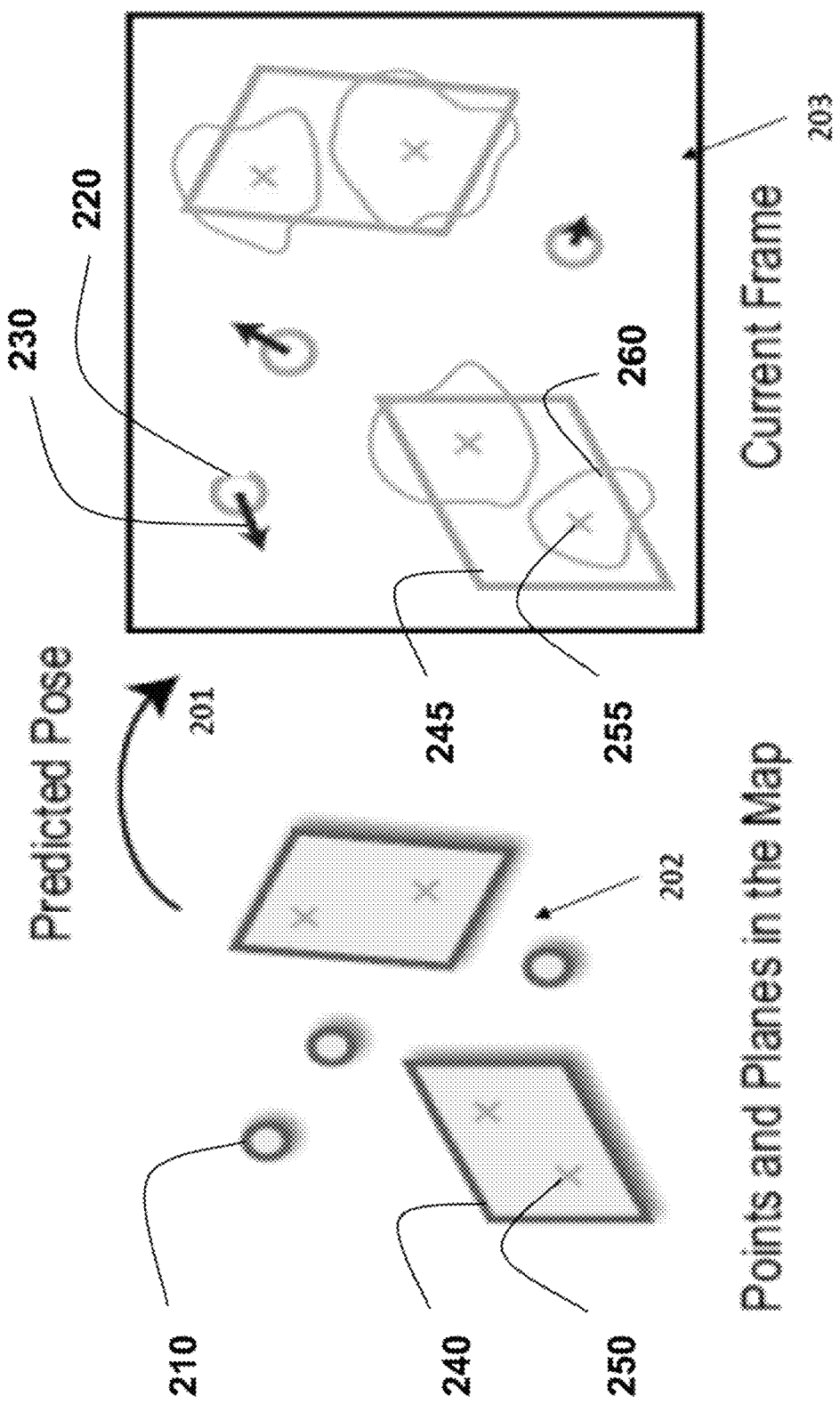
FIG. 2 is a schematic of a procedure to establish point-to-point and plane-to-plane correspondences between a current frame and a map using a predicted pose of the camera according to embodiments of the invention.

As shown in FIG. 2, we locate point and plane measurements in the k th frame corresponding to landmarks in the map using the predicted pose $\hat{T}_k$. Given the predicted pose 201 of the current frame, we locate correspondences between point and plane landmarks in the map 202 and point and plane measurements in the current frame 203. We first transform the landmarks in the map to the current frame using the predicted pose. Then, for every point, we perform local search using an optical flow procedure from the predicted pixel location in the current frame. For every plane, we first locate the parameters of the predicted plane. Then, we consider a set of reference points on the predicted plane, and locate pixels connected from each reference point that lie on the predicted plane. The reference point with the largest number of connected pixels is chosen and the plane parameters are refined using all the connected pixels.

Point Correspondence: Let $p_i = (x_i, y_i, z_i, 1)^T$ denote the I th point landmark 210 in the map, represented as a homogeneous vector. The 2D image projection 220 of $p_i$ in the current frame is predicted as $$\hat{p}_i^k = \hat{T}_k p_i, \quad \hat{u}_i^k = FP(\hat{p}_i^k), \quad (2)$$

where $\hat{p}_i^k$ is the 3D point transformed to the coordinate system of the k th frame, and the function $FP(\cdot)$ determines the forward projection of the 3D point onto the image. plane using the internal camera calibration parameters. We locate the corresponding point measurement by using Lucas-Kanade's optical flow method, starting from the initial position of $\hat{u}_i^k$. Let $\Delta u_i^k$ be the determined optical flow vector 230. Then, the corresponding point measurement $p_i^k$ is $$u_i^k = \hat{u}_i^k + \Delta u_i^k, \quad p_i^k = BP(u_i^k)D(u_i^k), \qquad (3)$$

where the function $BP(\cdot)$ back-projects the 2D image pixel to a 3D ray and $D(\cdot)$ refers to the depth value of the pixel. If the optical flow vector is not determined or the pixel location $u_i^k$ has an invalid depth value, then the feature is regarded as lost.

Plane Correspondence: Instead of performing a time-consuming plane extraction procedure on each frame independently from other frames, as is the prior art, we make use of the predicted pose to extract planes. This leads to faster plane measurement extraction, and also provides the plane correspondences.

Let $\pi_j = (a_j, b_j, c_j, d_j)^T$ denote the plane equation of the j th plane landmark 240 in the map. We assume that the plane landmark and the corresponding measurement have some overlapping regions in the image. To locate such a corresponding plane measurement, we randomly select several reference points 250 $q_{j,r}$ (r=1, ..., N) from the inliers of the j th plane landmark, and transform the reference points to the k th frame as 255

$$\hat{q}_{j,r}^k = \hat{T}_k q_{j,r} \quad (r=1, \ldots, N). \qquad (4)$$

We also transform $\pi_j$ to the k th frame as 245

$$\hat{\pi}_j^k = \hat{T}_k^{-T} \pi_j. \qquad (5)$$

We locate connected pixels 260 from each transformed reference point $\hat{q}_{j,r}^k$ that are on the plane $\hat{\pi}_j^k$, and select the pixel with the maximum inliers. The inliers are used to refine the plane equation, resulting in the corresponding plane measurement $\pi_j^k$. If the number of inliers is smaller than a threshold, then the plane landmark is declared as lost. For example, we use N=5 reference points, a threshold of 50 mm for the point-to-plane distance to determine inliers on a plane, and 9000 as the threshold of the minimum number of inliers.

Landmark Selection

Performing the above process using all the landmarks in the map can be inefficient. Therefore, we use the landmarks appearing in a single keyframe that is the closest to the current frame, The closest keyframe is selected by using the pose of the previous frame $T_{k-1}$ before the tracking process.

RANSAC Registration

The prediction-based correspondence search provides candidates of point-to-point and plane-to-plane correspondences, which may include outliers. Thus, we perform the RANSAC-based registration to determine inliers and determine the camera pose. To determine the pose without ambiguity, we need at least three correspondences. Thus, if there are less than three candidates of correspondences, then we immediately determine a tracking failure. For accurate camera tracking, we also determine the tracking failure when there is only a small number of candidates of correspondences.

If there is a sufficient number of candidates, then we solve the registration problem using the mixed correspondences in a closed-form, The procedure prioritizes plane correspondences over point correspondences, because the number of planes is typically much smaller than the number of points, and planes have less noise due to the support from many points. Tracking is considered successful if the RANSAC locates a sufficient number of inliers, e.g., 40% of the number of all point and plane measurements. The method yields the corrected pose of the k th frame, $T_k$.

Map Update

We determine the k th frame as a keyframe if the estimated pose $T_k$ is sufficiently different from the poses of any existing keyframes in the map. To check this condition, we can for example use thresholds of 100 mm in translation and 5° in rotation. For the new keyframe, the point and plane measurements located as inliers in the RANSAC-based registration are associated to corresponding landmarks, while those located as outliers are discarded. We then extract additional point and plane measurements, which newly appear in this frame. The additional point measurements are extracted using a keypoint detector, such as Scale-Invariant Feature Transform (SIFT) and Speeded Up Robust Features (SURF), on pixels that are not close to any existing point measurements. The additional plane measurements are extracted by using a RANSAC-based plane fitting on pixels that are not inliers of any existing plane measurements. The additional point and plane measurements are added as new landmarks to the map. In addition, we extract feature descriptors, such as SIFT and SURF, for all point measurements in the frame, which are used for relocalization.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for tracking a pose of a camera by registering data using a set of primitives, wherein the data have three dimensions (3D) and the primitives include points and planes, comprising steps of:
   acquiring the data as a sequence of frames by the camera, wherein the camera is a red, green, blue and depth (RGB-D) camera and the camera is movable, wherein for each acquired frame the method comprises:
   predicting a current pose of the camera acquiring a current frame using a previous pose of the camera and a model of a motion of the camera;
   determining a transformation between a first coordinate system and a second coordinate system of the camera in the current pose;
   transforming landmarks in the first coordinate system into the second coordinate system using the transformation, wherein the landmarks include
   at least three primitives and at least one plane;
   determining landmarks in the current frame in the second coordinate system;
   determining a correspondence between the landmarks determined in the second coordinate system and the landmarks transformed from the first coordinate system; and
   registering the second coordinate system with the first coordinate system by updating the transformation according to the determined correspondence; and
   tracking the pose of the camera according to the registering, wherein the steps are performed in a processor.

2. The method of claim 1, wherein the first set of primitives includes at least one point and at least one plane in the first coordinate system, and the second set of primitives includes at least one point and at least one plane in the second coordinate system.

3. The method of claim 1, wherein the data include textures and depths.

4. The method of claim 1, wherein the registering uses RANdom SAmple Consensus (RANSAC).

5. The method of claim 1, further comprising:
selecting a set of frames as keyframes from the sequence of frames; and
storing the keyframes in a map, wherein the keyframes include the points and the planes, and the points and the planes are stored in the map as landmarks.

6. The method of claim 5, further comprising:
predicting a pose of the camera for each frame; and
determining the pose of the camera for each frame according to the registering to track the camera.

7. The method of claim 6, wherein the pose of a k th frame is $$T_k = \begin{pmatrix} R_k & t_k \\ 0^T & 1 \end{pmatrix},$$

where $R_k$ and $t_k$ respectively denote a rotation matrix and a translation vector.

8. The method of claim 6, wherein the predicting uses a constant velocity assumption.

9. The method of claim 5, further comprising:
applying bundle adjustment using the points and the planes to refine the landmarks in the map.

10. The method of claim 1, wherein the registering is in real time.

11. The method of claim 1, wherein an optical flow procedure is used to locate the points in the frames.

12. The method of claim 1, wherein correspondences of the planes are prioritizes over correspondences of the points.

13. The method of claim 1, wherein the registering is used for simultaneous localization and mapping (SLAM).

14. A system for tracking a pose of a camera by registering data using a set of primitives, wherein the data have three dimensions (3D) and the primitives include points and planes, comprising:
a camera for acquiring the data as a sequence of frames, wherein the camera is a red, green, blue and depth (RGB-D) camera; and
a processor operatively connected to the camera for tracking the pose of the camera, wherein the processor, for each acquired frame,
predicts a current pose of the camera acquiring a current frame using a previous pose of the camera and a model of a motion of the camera;
determines a transformation between a first coordinate system and a second coordinate system of the camera in the current pose;
transforms landmarks in the first coordinate system into the second coordinate system using the transformation, wherein the landmarks include at least three primitives and at least one plane;
determines landmarks in the current frame in the second coordinate system;
determining a correspondence between the landmarks determined in the second coordinate system and the landmarks transformed from the first coordinate system; and
registering the second coordinate system with the first coordinate system by updating the transformation according to the determined correspondence.

* * * * *